US012515845B2

(12) United States Patent
Cobert et al.

(10) Patent No.: US 12,515,845 B2
(45) Date of Patent: Jan. 6, 2026

(54) INTERNAL CARDBOARD SUPPORT FOR RECEIVING PHARMACEUTICAL PRODUCTS, PACKAGING AND METHOD FOR PACKAGING

(71) Applicant: SANOFI PASTEUR, Lyons (FR)

(72) Inventors: Reynald Cobert, Paris (FR); Christophe DeJonghe, Paris (FR); Olivier Dufour, Paris (FR); Teddy Klein, Paris (FR); Benoit Kunz, Paris (FR); Yoann Loubeau, Paris (FR); Stephan Montou, Paris (FR); Philippe Revolte, Paris (FR); Jonathan Rousselet, Paris (FR)

(73) Assignee: SANOFI PASTEUR, Lyons (FR)

( * ) Notice: Subject to any disclaimer, the term of this patent is extended or adjusted under 35 U.S.C. 154(b) by 403 days.

(21) Appl. No.: 18/022,871

(22) PCT Filed: Aug. 24, 2021

(86) PCT No.: PCT/EP2021/073345
§ 371 (c)(1),
(2) Date: Feb. 23, 2023

(87) PCT Pub. No.: WO2022/043301
PCT Pub. Date: Mar. 3, 2022

(65) Prior Publication Data
US 2023/0356878 A1 Nov. 9, 2023

(30) Foreign Application Priority Data
Aug. 25, 2020 (EP) .................................. 20315390

(51) Int. Cl.
*B65D 5/50* (2006.01)
(52) U.S. Cl.
CPC ................. *B65D 5/5007* (2013.01)

(58) Field of Classification Search
CPC ...... B65D 5/5007; B65D 5/5002; B65D 5/50; B65D 5/5011; B65D 5/5016; B65D 5/5019
See application file for complete search history.

(56) References Cited

U.S. PATENT DOCUMENTS

2017/0297803 A1 10/2017 Chambers et al.

FOREIGN PATENT DOCUMENTS

DE 4228026 3/1994
DE 4228026 A1 * 3/1994 ............... B65D 5/38
(Continued)

OTHER PUBLICATIONS

International Preliminary Report on Patentability in International Appln. No. PCT/EP2021/073345, mailed on Mar. 9, 2023, 8 pages.

(Continued)

*Primary Examiner* — Javier A Pagan
(74) *Attorney, Agent, or Firm* — Bond, Schoeneck & King, PLLC (57) ABSTRACT

An internal cardboard support for a cardboard packaging includes a main compartment having a main housing configured for receiving a main pharmaceutical item, a bottom wall and two edge members protruding from the bottom wall, the main compartment being located between the two edge members, the main housing being bounded by both the bottom wall and the two edge members, and each edge member having a plurality of wall portions (which are arranged with respect to the bottom wall so that each edge member is of a substantially parallelepipedic shape and extends longitudinally along the housing of the main compartment; and at least one edge member forms an additional compartment which comprises at least one additional housing which extends longitudinally, which has an opening formed on at least one of the respective wall portions, and (Continued)

which is configured for receiving through the opening at least one additional pharmaceutical item.

17 Claims, 10 Drawing Sheets

(56) References Cited

FOREIGN PATENT DOCUMENTS

| | | | |
|---|---|---|---|
| DE | 9421074 U1 | 4/1995 | |
| JP | H05221444 A | 8/1993 | |
| JP | H06-183476 A | 7/1994 | |
| JP | H11292054 A | 10/1999 | |
| JP | 2010-137872 A | 6/2010 | |
| WO | WO 2011/141871 | 11/2011 | |
| WO | WO-2011141871 A1 * | 11/2011 | ............ B65D 71/72 |
| WO | WO 2022/043301 | 3/2022 | |

OTHER PUBLICATIONS

International Search Report and Written Opinion in International Appln. No. PCT/EP2021/073345, mailed on Nov. 22, 2021, 9 pages.
Notice of Reasons for Rejection for Japanese Patent Application No. 2023-513318 mailed Jul. 22, 2025 (8 pages, with pp. 1-4 being a translation).

* cited by examiner

INTERNAL CARDBOARD SUPPORT FOR RECEIVING PHARMACEUTICAL PRODUCTS, PACKAGING AND METHOD FOR PACKAGING

CROSS REFERENCE TO RELATED APPLICATIONS

The present application is the national stage entry of International Patent Application No. PCT/EP2021/073345, filed on Aug. 24, 2021, and claims priority to Application No. EP 20315390.3, filed on Aug. 25, 2020, the disclosures of which are incorporated herein by reference.

TECHNICAL FIELD

The present disclosure relates to an internal cardboard support for a cardboard packaging configured for receiving pharmaceutical products.

The present disclosure further relates to such a cardboard packaging, to a set of cardboard packaging, and also to a method for packaging pharmaceutical products in such a cardboard packaging.

BACKGROUND

Cardboard packaging for pharmaceutical products are well known. For instance, the Marchesini Group Company proposes a carton for syringe in the form of a tray.

Such a tray comprises a main compartment having a housing in which the syringe is located.

The tray is formed by a bottom wall from which protrude two edge members which extend longitudinally along the housing of the main compartment, the main compartment being located between the edge members and the housing for the syringe being bounded by the bottom wall and the two edge members.

Each edge members has a plurality of wall portions which are arranged with respect to the bottom wall in order to be of a substantially parallelepipedic shape.

A notch is formed in each of the edge members and configured for receiving a collar portion of the syringe. Thus, the syringe is longitudinally maintained in the housing of the main compartment.

The tray is configured to admit a blank configuration in which the wall portions of the edge members are at least partially flattened on the bottom wall and an erected configuration in which the wall portions of the edge members are raised and extend remotely to the bottom wall.

The syringe is introduced into the housing of the main compartment when the tray is in its erected configuration.

SUMMARY

The present disclosure is directed to a cardboard packaging for pharmaceutical products, having an internal cardboard packaging which is like a tray and which is particularly convenient for both use and manufacture.

The present disclosure provides according to a first aspect, an internal cardboard support for a cardboard packaging configured for receiving pharmaceutical products, comprising a main compartment having a main housing configured for receiving a main pharmaceutical item such as a syringe, a bottom wall and two edge members protruding from the bottom wall, the main compartment being located between the two edge members, the main housing being bounded by both the bottom wall and the two edge members, and each of the edge members having a plurality of wall portions which are arranged with respect to the bottom wall so that each edge member is of a substantially parallelepipedic shape and extends longitudinally along the main housing of the main compartment; characterized in that at least one of the edge members forms an additional compartment which comprises at least one additional housing which extends longitudinally, which has an opening formed on at least one of the respective wall portions, and which is configured for receiving through the opening at least one additional pharmaceutical item, such as needle and/or vial and/or a dedicated connector.

The internal cardboard support subject-matter of the present disclosure is configured for receiving one or a plurality of additional pharmaceutical items in addition to the main pharmaceutical item, thanks to at least one additional housing which is formed in at least one of the edge members of the internal cardboard support, thus creating at least one additional compartment on this support, such at least one additional housing of the at least one additional compartment being located adjacent to the main housing formed in the main compartment.

All the main and additional housings of the internal cardboard support of the present disclosure extend longitudinally and are thus arranged side by side, or in a juxtaposition manner. Said otherwise, by using at least one of the edge members for creating an additional compartment, the internal cardboard support subject matter of the present disclosure allows to multiplicate housings arranged side by side in a particularly compact manner.

The at least one additional pharmaceutical item can be associated to the main pharmaceutical item. For instance, the at least one vial and/or the at least one needle and/or the at least one dedicated connector in the at least one additional housing can be able to equip the syringe in the main housing, the at least one vial and/or the at least one needle and/or the dedicated connector being thus some accessories of the syringe.

Features which are simple, convenient and economical for embodying the internal cardboard support according to the present disclosure are described below.

The at least one additional compartment which has the at least one additional housing may comprise flap members which extend in the at least one additional compartment and delimit longitudinally the at least one additional housing.

The flap members may be formed in the at least one of the respective wall portions in which is formed the opening.

The flap members may be folded and directed towards the bottom wall.

The flap members face to each other in the at least one additional housing.

The at least one additional compartment may comprise a first wall portion which extends vertically from the bottom wall, a second wall portion which extends horizontally from the first wall portion and which faces the bottom wall, and a third wall portion which extends vertically from the second wall portion, which faces the first wall portion and which is directed towards the bottom wall.

The at least one opening of the at least one additional housing is formed in the second wall portion.

The at least one additional compartment may comprise a fourth wall portion which extends from the third wall portion and which is fixed to the bottom wall.

The third wall portion of the additional compartment which has the additional housing forms a separate portion between the additional housing and the main housing.

The third wall portion and/or the first wall portion of the additional compartment which has the additional housing may comprise a gripping cut-out.

At least the third wall portion of the additional compartment may comprise a notch emerging in the main housing and being configured for receiving a collar portion of the main pharmaceutical item.

The internal cardboard support may admit a blank configuration in which the additional compartments are at least partially flattened on the bottom wall.

The present disclosure also provides, according to a second aspect, a cardboard packaging for pharmaceutical products, comprising at least one internal cardboard support as described above, a main pharmaceutical item such as a syringe introduced into a main housing of a main compartment of the internal cardboard support and at least one additional pharmaceutical item, such as needle and/or vial and/or a dedicated connector, introduced into at least one additional housing of at least one additional compartment of the internal cardboard support.

The cardboard packaging may further comprise an external box in which is introduced the at least one internal cardboard support filled with the pharmaceutical items.

A leaflet can also be introduced into the external box.

The present disclosure also provides, according to a third aspect, a set of cardboard packaging as described above, comprising a plurality of internal cardboard supports in each of which is introduced a plurality of predetermined pharmaceutical items chosen amongst the combinations of a syringe and one or several needles, a syringe and one or several vials, a syringe and one or several needles and one or several vials and/or one or several dedicated connectors.

The present disclosure also provides, according to a fourth aspect, a method for packaging pharmaceutical products in a cardboard packaging as described above, comprising the step of providing an internal cardboard support and the step of introducing the main pharmaceutical item into the main housing and the at least one additional pharmaceutical item into the at least one additional housing.

The method may comprise the step of providing the internal cardboard support in a blank configuration wherein the edge members are at least partially flattened on the bottom wall and then the step of raising the internal cardboard support from the blank configuration to an erected configuration in which the wall portions of the additional compartments are raised and extend remotely to the bottom wall.

BRIEF DESCRIPTION OF THE FIGURES

The description of the present disclosure now continues with a detailed description of preferred embodiments given hereinafter by way of non-limiting example and with reference to the appended drawings.

DETAILED DESCRIPTION

Figure 1:
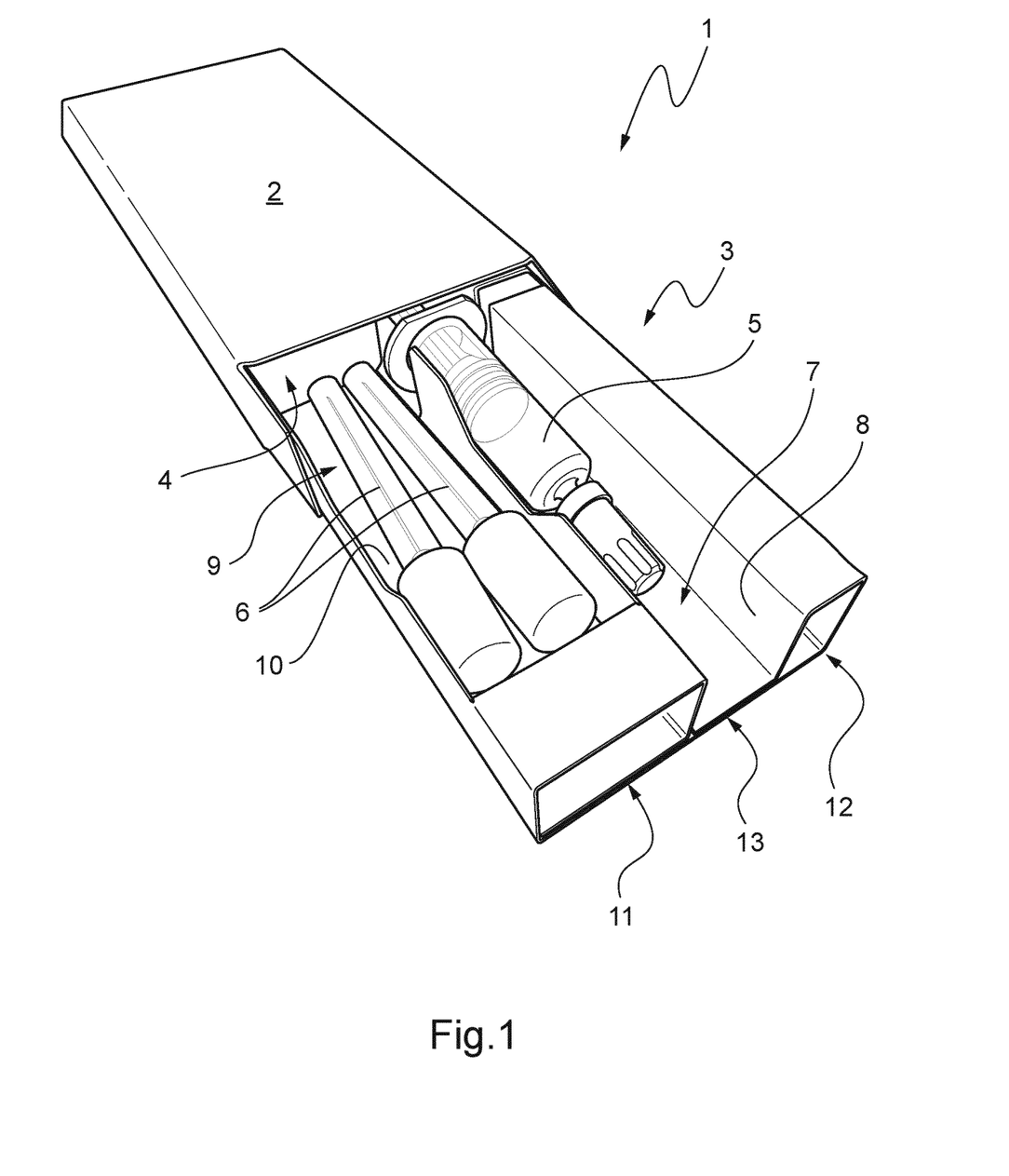
FIG. 1 is a perspective view of a cardboard packaging having an external box in which are partially introduced an internal cardboard support according to a first embodiment, which is filled with a main pharmaceutical item and with a plurality of additional pharmaceutical items.

FIG. 1 shows a cardboard packaging 1 for pharmaceutical products, comprising an external box 2, here made of cardboard, in which is introduced an internal cardboard support 3 according to a first embodiment.

The external box 2 is of a parallelepipedic shape and comprises an opening 4 for the introduction of the internal cardboard support 3 by an end of the external box 2.

The external box 2 has an internal space configured for receiving the internal cardboard support 3. The global outline of the internal cardboard support 3 is here similar to the global outline of the external box 2.

The cardboard packaging 1 further comprises pharmaceutical products which are here formed by a main pharmaceutical item such as a syringe 5, and by two additional pharmaceutical items such as needles 6 which are located in a juxtaposition manner with the main pharmaceutical item.

The syringe 5 is housed in a main housing 7 formed in a main compartment 8 of the internal cardboard support 3.

The needles 6 are housed in a first additional housing 9 formed in a first additional compartment 10 which is itself formed in a first edge member 11 of the internal cardboard support 3.

The main housing 7 and the first additional housing 9 extend longitudinally and are arranged side by side.

No other housing is formed in the internal carboard support 3.

Here, the needles 6 form accessories which are able to equip the syringe 5.

The main compartment 8 is located between the first edge member 11 which comprises the first additional compartment 10 and a second edge member 12 of the internal cardboard support 3.

Thus, the main housing 7 is located between the first additional housing 9 made in the first edge member 11 and the second edge member 12.

Said otherwise, the syringe 5 is housed between the needles 6 in the first additional housing 9 and the second edge member 12.

The internal cardboard support 3 is thus filled with the syringe 5 and the needles 6 and introduced into the external box 2.

The first and second edge members 11 and 12 protrude from a bottom wall 13 of the internal cardboard support 3.

The first and second edge members 11 and 12 have each a substantially parallelepipedic shape and extend longitudinally along the main housing 7 of the main compartment 8.

The main compartment 8 is bounded by both the bottom wall 13 and the first and second edge members 11 and 12.

The use of the first edge member 11 to create an additional compartment is very convenient and allows storing additional pharmaceutical items by keeping a compact cardboard packaging.

As shown in FIG. 1, the internal cardboard support 3 is in an erected configuration in which the first and second edge members 11 and 12 are raised and extend remotely to the bottom wall 13.

Figure 2:
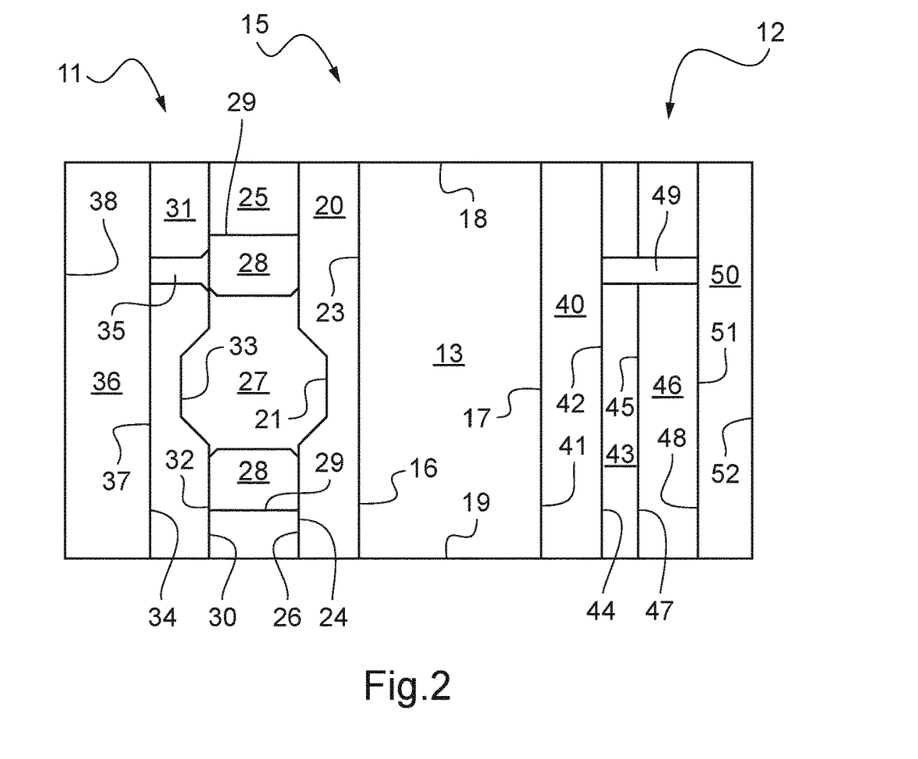
FIG. 2 is a top view of a sheet of cardboard from which is issued the internal cardboard support illustrated in FIG. 1.

The internal cardboard support 3 is issued from a sheet of cardboard 15 which is shown on FIG. 2.

In particular, the sheet of cardboard 15 comprises a central wall portion which forms the bottom wall 13 and which has four sides, respectively a first side 16, a second side 17 opposite to the first side 16, a third side 18 linked to the first and second sides 16, 17 and a fourth side 19 opposite to the third side 18 and also linked to the first and second sides 16, 17.

The sheet of cardboard 15 further comprises a first plurality of lateral wall portions extending from the first side 16 of the central wall portion and being configured to form the first edge member 11; and a second plurality of lateral wall portions extending from the second side 17 of the central wall portion and being configured to form the second edge member 12.

The first plurality of lateral wall portions is provided with a first wall portion 20 which extends by a first side 23 from the first side 16 of the central wall portion.

The first wall portion 20 has a gripping cut-out 21 formed in a second side 24 opposite to the first side 23.

The first plurality of lateral wall portions is further provided with a second wall portion 25 which extends by a first side 26 from the second side 24 of the first wall portion 20.

The second wall portion 25 comprises a first opening 27 and two flap members 28 which face each other and delimit the first opening 27.

The second wall portion 25 comprises two folded lines 29 around which the flap members 28 are configured to rotate.

The first plurality of lateral wall portions is further provided with a third wall portion 31 which extends by a first side 32 from a second side 30 of the second wall portion 25 which is opposite to the first side 26 thereof.

The third wall portion 31 has a gripping cut-out 33 formed in the first side 32.

Both gripping cut-outs 21 and 33 respectively of the first and third wall portions 20 and 31 emerge in the first opening 27 of the second wall portion 25.

The third wall portion 31 has a first notch 35 which here extends for a second side 34 opposite to the first side 32 and emerges on the first side 32, in the vicinity of the first opening 27.

The first plurality of lateral wall portions is further provided with a fourth wall portion 36 which extends by a first side 37 from the second side 34 of the third wall portion 31.

The fourth wall portion 36 has a second side 38 opposite to the first side 37.

The second plurality of lateral wall portions is provided with a first wall portion 40 which extends by a first side 41 from the second side 17 of the central wall portion.

The first wall portion 40 has a second side 42 opposite to the first side 41.

The second plurality of lateral wall portions is further provided with a second wall portion 43 which extends by a first side 44 from the second side 42 of the first wall portion 40.

The second wall portion 43 has a second side 45 opposite to the first side 44.

The second plurality of lateral wall portions is further provided with a third wall portion 46 which extends by a first side 47 from the second side 45 of the second wall portion 43.

The third wall portion 46 has a second side 48 opposite to the first side 47.

A second notch 49 is formed both on the second and third wall portions 43 and 46, from the first side 44 of the second wall portion 43 to the second side 48 of the third wall portion 46.

The second plurality of lateral wall portions is further provided with a fourth wall portion 50 which extends by a first side 51 from the second side 48 of the third wall portion 46.

The fourth wall portion 50 has a second side 52 opposite to the first side 51.

Figure 3:
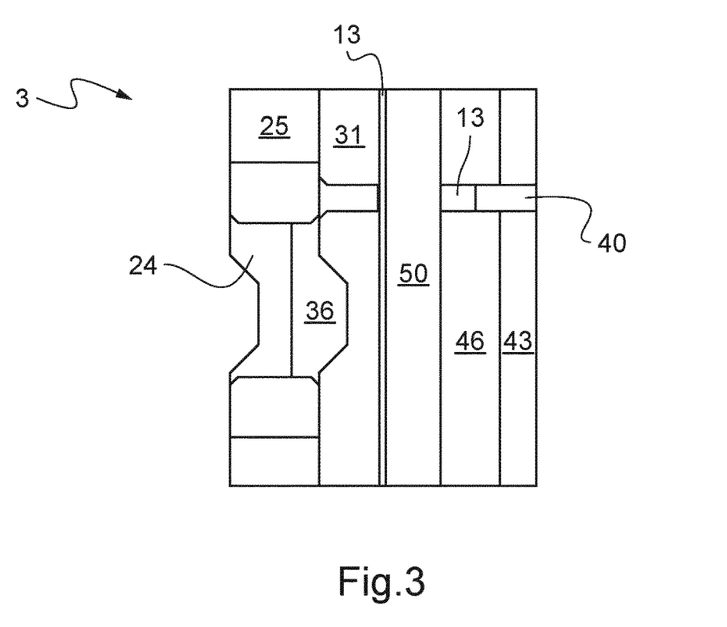
FIG. 3 is a top view of the internal cardboard support illustrated in FIG. 1, in a blank configuration.

The sheet of cardboard 15 is folded in order to provide the internal cardboard support 3 in a blank configuration which is shown on FIG. 3.

In this described embodiment, regarding the first plurality of wall portions, the fourth wall portion 36 is folded on the third wall portion 31 and also partially on the second wall portion 25, and all the second, third and fourth wall portions 25, 31 and 36 are folded on the first wall portion 20 and partially on the central wall portion.

Thus, the fourth wall portion 36 is located on the bottom wall 13 and is fixed thereof, for instance by gluing, the third wall portion 31 is located on the fourth wall portion 36 and the second wall portion 25 is located on the first wall portion 20 and partially on the fourth wall portion 36.

Regarding the second plurality of wall portions, the second wall portion 43 is folded on the first wall portion 40, the third wall portion 46 is folded partially on the first wall portion 40 and partially on the central wall portion, that is to say the bottom wall 13, and the fourth wall portion 50 is folded and fastened on the central wall portion.

The fourth wall portion 50 can be glued on the bottom wall 13.

Thus, in the blank configuration of the internal cardboard support 3, the edge members 11 and 12 are at least partially flattened on the bottom wall 13.

This is from the blank configuration that the internal cardboard support 3 as shown on FIG. 1 in the erected configuration is obtained.

In particular, the internal cardboard support 3 in the blank configuration is provided. As stated above, the edge members 11 and 12 are at least partially flattened on the bottom wall 13. For instance, the internal cardboard support 3 in the blank configuration is stored in a magazine. Then, the internal cardboard support 3 in the blank configuration is grasped by a dedicated movable tool, such as a rotatable head or a robotised arm, and introduced into a channel member having a predetermined shape so that the wall portions of the edges members 11 and 12 raise and extend remote to the bottom wall 13.

The above description of the blank configuration of the internal cardboard support 3 is dedicated to the sheet 15 illustrated on FIG. 2.

Said otherwise, the locations of the different wall portions in said blank configuration depend of the dimensions of these respective wall portions.

For instance, if the respective first wall portions 20, 40 and third wall portions 31, 46 are wider, the respective fourth wall portions 36, 46 may be folded only on the respective third wall portions 31, 46 and not on the respective second wall portions 25, 43. In this case, the internal cardboard support obtained is higher. Other variants are possible.

Figure 4:
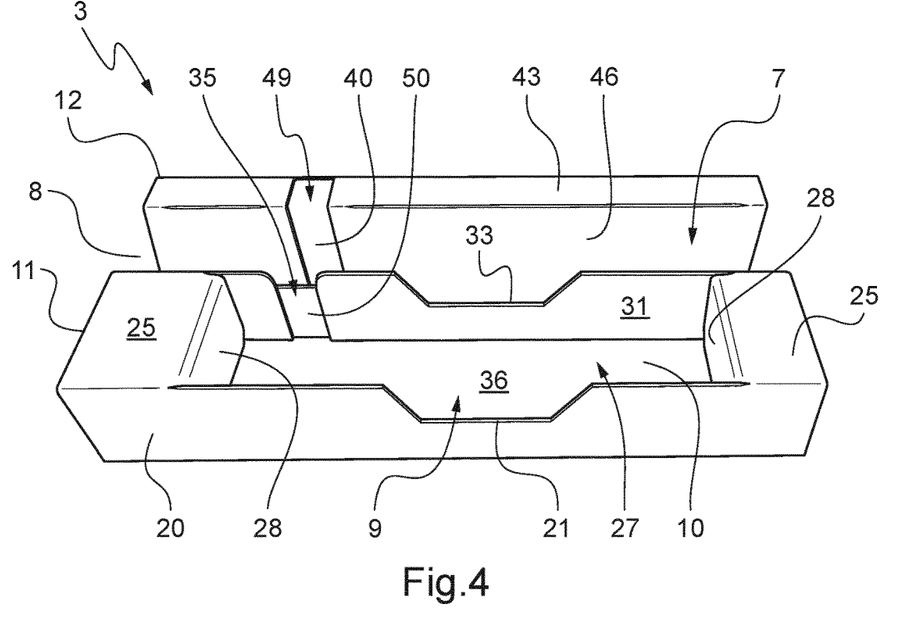
FIGS. 4 to 6 are top, perspective views of the internal cardboard support illustrated in FIG. 1, but taken alone and devoid of pharmaceutical items.
Figure 5:
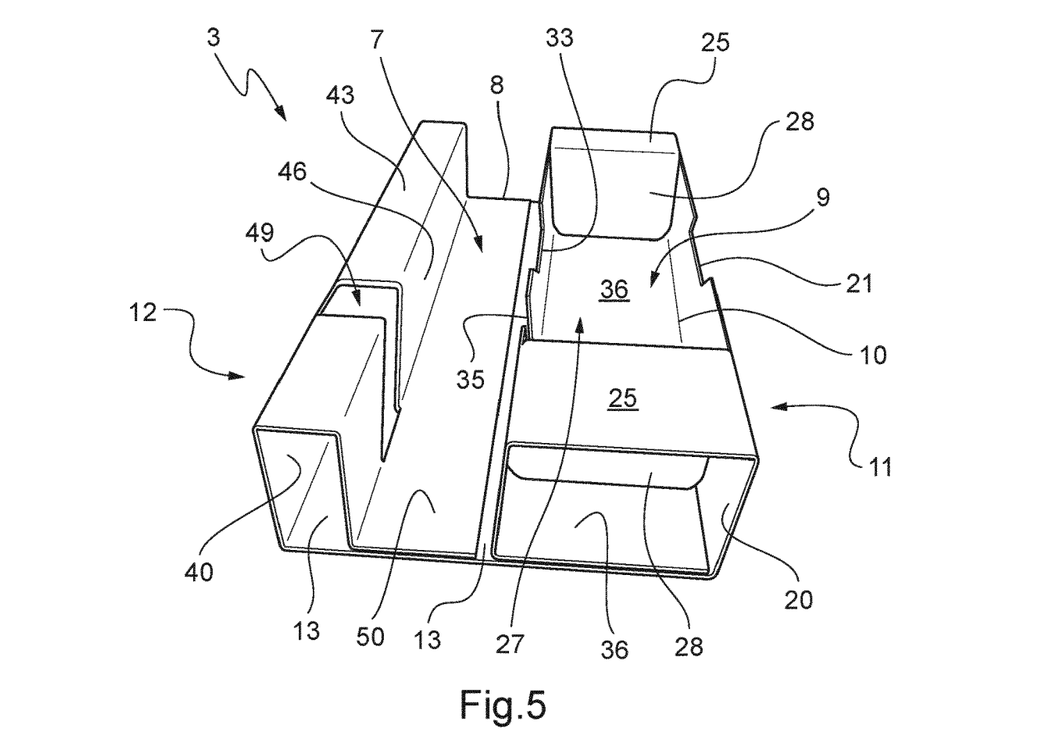
Figure 6:
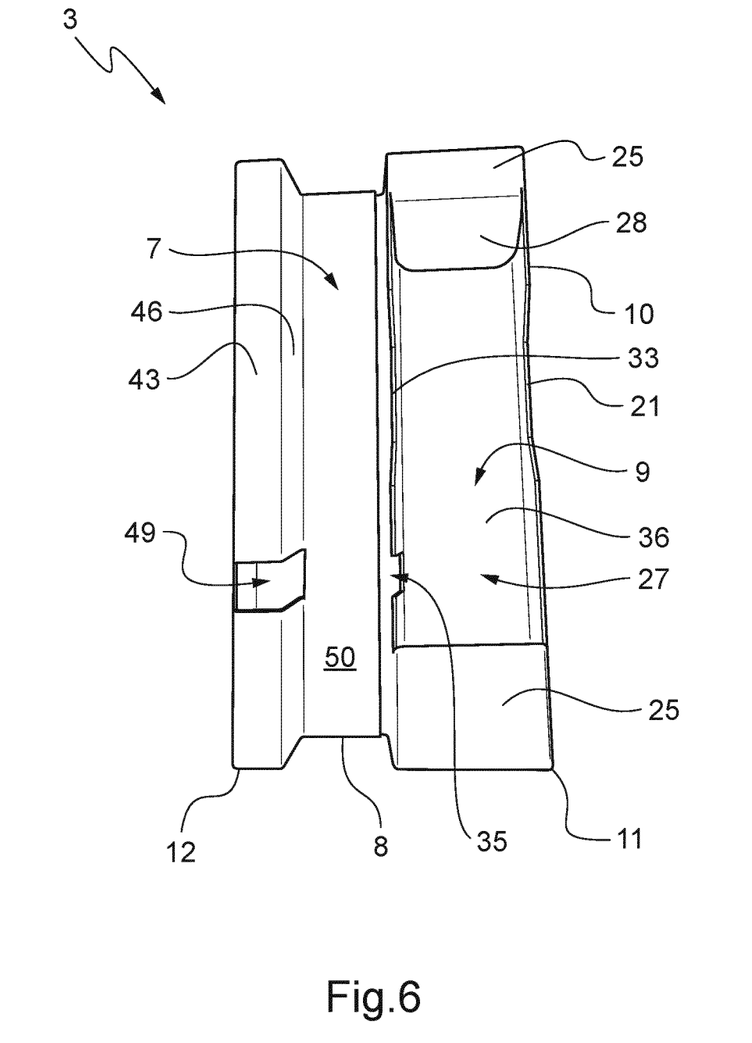

The internal cardboard support 3 in the erected configuration is shown in FIGS. 4 to 6 without a syringe or needles.

The internal cardboard support 3 thus comprises the main compartment 8 located between the first and second edge members 11 and 12.

In particular, the first edge member 11 has the parallelepipedic shape in which the first wall portion 20 extends vertically from the bottom wall 13; the second wall portion 25 extends horizontally from the first wall portion 20 and faces the fourth wall portion 36; the third wall portion 31 extends vertically from the second wall portion 25, faces the first wall portion 20 and is directed towards the bottom wall 13; and the fourth wall portion 36 extends horizontally from the third wall portion 31, is fastened to the bottom wall 13 and is directed towards the first wall portion 20.

The first additional compartment 10 is formed in the first edge member 11 and the first opening 27 made on the second wall portion 25 which extends horizontally and remote to the bottom wall 13 allows to access to the first additional housing 9 for receiving the needles as shown on FIG. 1.

The two flap members 28 are rotated around the folded lines 29 of the second wall portion 25 and directed towards the fourth wall portion 36 and more generally towards the bottom wall 13.

Thus, the flap members 28 face to each other and delimit the length of the first additional housing 9.

To be noted that using such flap members 28 allow to have a length of the first additional housing 9 which is not fixed but rather slightly variable, depending on the inclination of the flap members 28 in the first additional compartment 10.

Furthermore, the flap members 28 may act such as retainers for the needles located in the first additional housing 9.

In particular, when the needles are introduced into the first additional compartment 10, they can be pushed against the flap members 28 so that they can define themselves the length of the first additional housing 9 in which they are located. When stored, free ends of the needles are thus in abutment against the flap members 28.

In variant, the flap members can be pushed by a dedicated tool before loading the needles.

The first and second gripping cut-outs 21 and 33 formed respectively in the first and third wall portions 20 and 31 of the first edge member 11 face to each other and allow facilitating the access to the first additional housing 9 and such to facilitate the handling of the needles.

The first notch 35 emerges on the third wall portion 31 of the first edge member 11, the latter forming a separation between the main housing 7 and the first additional housing 9.

The second edge member 12 has the parallelepipedic shape in which the first wall portion 40 extends vertically from the bottom wall 13; the second wall portion 43 extends horizontally from the first wall portion 40 and faces the bottom wall 13; the third wall portion 46 extends vertically from the second wall portion 43, faces the first wall portion 40 and is directed towards the bottom wall 13; and the fourth wall portion 50 extends horizontally from the third wall portion 46, is fastened to the bottom wall 13 and is directed towards the first edge member 11.

The second notch 49 emerges on both second and third wall portions 43 and 46 and faces at least partially the first notch 35.

Thus the syringe shown on FIG. 1 is housed in the main housing 7 defined between the third wall portion 46 of the second edge member 12 and the third wall portion 31 of the first edge member 11 and also bounded by a part of the bottom wall 13 and the fourth wall portion 50 of the second edge member 12 which is fastened on the bottom wall 13.

The syringe has a collar portion which is introduced into the first and second notches 35 and 49 and a body which extends longitudinally in the main housing 7 of the main compartment 8.

Figure 7:
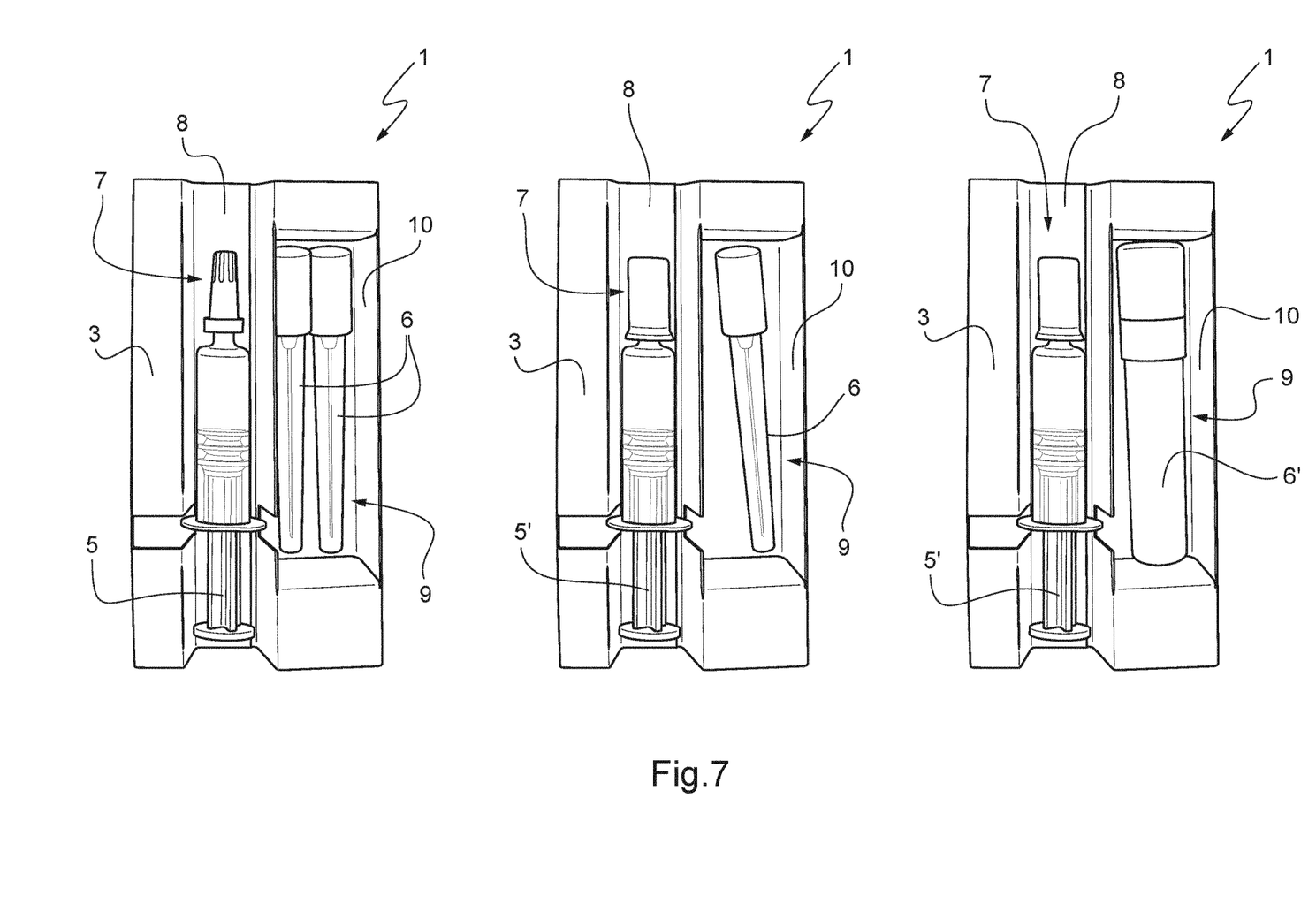
FIG. 7 is a top view of a set of cardboard packaging, each comprising an internal cardboard support according to a variant of the first embodiment of the internal cardboard support, and a plurality of pharmaceutical items chosen amongst predetermined combinations of pharmaceutical items.

FIG. 7 shows top views illustrating a set of cardboard packaging 1, each comprising an internal cardboard support 3 according to a variant, and a plurality of pharmaceutical items chosen amongst predetermined combinations of pharmaceutical items and located side by side in the internal cardboard support 3.

The internal cardboard supports illustrated on FIG. 7 are similar to the internal cardboard support illustrated on FIGS. 1 and 4 to 6, except that it is devoid of gripping cut-outs on the respective third wall portions of the first and second edge members.

The cardboard packaging 1 shown on the left of FIG. 7 comprises a so-called LSP syringe 5 located in the main housing 7 of the main compartment 8 and two needles 6 located in the first additional housing 9 of the first additional compartment 10 of the internal cardboard support 3.

The cardboard packaging 1 shown on the middle of FIG. 7 comprises a so-called LLR syringe 5' located in the main housing 7 of the main compartment 8 and one needle 6 located in the first additional housing 9 of the first additional compartment 10 of the internal cardboard support 3.

The cardboard packaging 1 shown on the right of FIG. 7 comprises a so-called LLR syringe 5' located in the main housing 7 of the main compartment 8 and one so-called safety needle 6' located in the first additional housing 9 of the first additional compartment 10 of the internal cardboard support 3.

Figure 8:
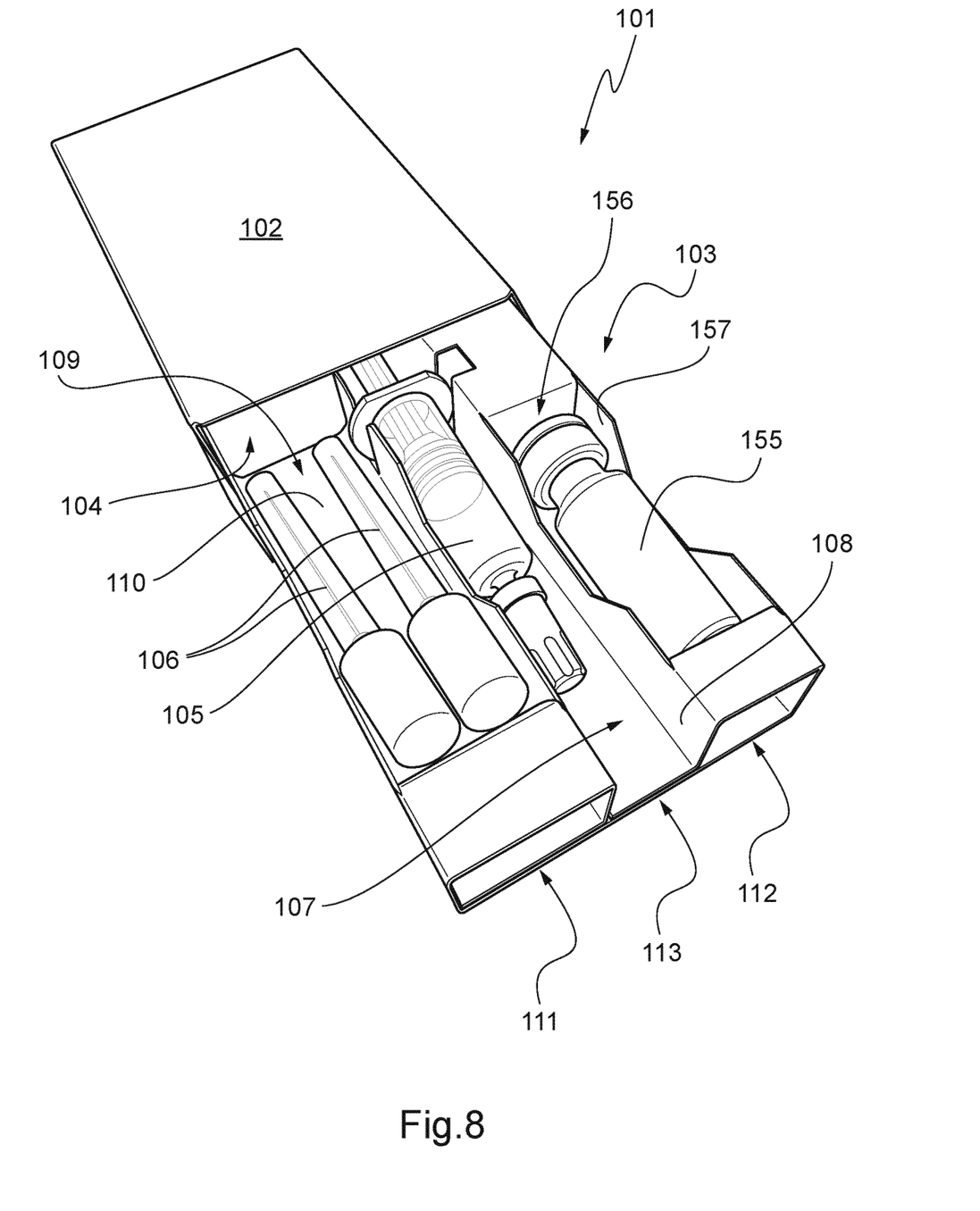
FIG. 8 is a perspective view of a cardboard packaging having an external box in which are partially introduced an internal cardboard support according to a second embodiment, which is filled with a main pharmaceutical item and with a plurality of additional pharmaceutical items.

FIG. 8 shows another cardboard packaging for pharmaceutical products. The same reference numbers are used for similar parts but increased by 100.

The cardboard packaging 101 comprises an external box 102, here made of cardboard, in which is introduced an internal cardboard support 103 according to a second embodiment.

The external box 102 is of a parallelepipedic shape and comprises an opening 104 for the introduction of the internal cardboard support 103 by an end of the external box 102.

The external box 102 has an internal space configured for receiving the internal cardboard support 103. The global outline of the internal cardboard support 103 is here similar to the global outline of the external box 102.

Both external box 102 and internal cardboard support 103 are greater than the external box 2 and the internal cardboard support 3 respectively of the cardboard packaging 1.

The cardboard packaging 101 further comprises pharmaceutical products which are here formed by a main pharmaceutical item such as a syringe 105, and by three additional pharmaceutical items such as needles 106 and a vial 155 which are located in a juxtaposition manner with the main pharmaceutical item. The syringe 105 is housed in a main housing 107 formed in a main compartment 108 of the internal cardboard support 103.

The needles 106 are housed in a first additional housing 109 formed in a first additional compartment 110 which is itself formed in a first edge member 111 of the internal cardboard support 103.

The vial 155 is housed in a second additional housing 156 formed in a second additional compartment 157 which is itself formed in a second edge member 112 of the internal cardboard support 103.

The main housing 107, the first additional housing 109 and the second additional housing 156 extend longitudinally and are arranged side by side.

No other housing is formed in the internal carboard support 103. Here, the needles 106 and the vial 155 form accessories which are able to equip the syringe 105.

The main compartment 108 is located between the first edge member 111 which comprises the first additional compartment 110 and the second edge member 112 which comprises the second additional compartment 157.

Thus, the main housing 107 is located between the first additional housing 109 made in the first edge member 111 and the second additional housing 156 made in the second edge member 112.

Said otherwise, the syringe 105 is housed between the needles 106 in the first additional housing 109 and the vial 155 in the second additional housing 156.

The internal cardboard support 103 is thus filled with the syringe 105, the needles 106 and the vial 155 and introduced into the external box 102.

The first and second edge members 111 and 112 protrude from a bottom wall 113 of the internal cardboard support 103.

The first and second edge members 111 and 112 have each a substantially parallelepipedic shape and extends longitudinally along the main housing 107 of the main compartment 108.

The main compartment 108 is bounded by both the bottom wall 113 and the first and second edge members 111 and 112.

The use of both the first and second edge members 111 and 112 to create two additional compartments is very convenient and allows to multiplicate the stored additional pharmaceutical items by keeping a compact cardboard packaging.

As shown in FIG. 8, the internal cardboard support 103 is in an erected configuration in which the first and second edge members 111 and 112 are raised and extend remotely to the bottom wall 113.

Figure 9:
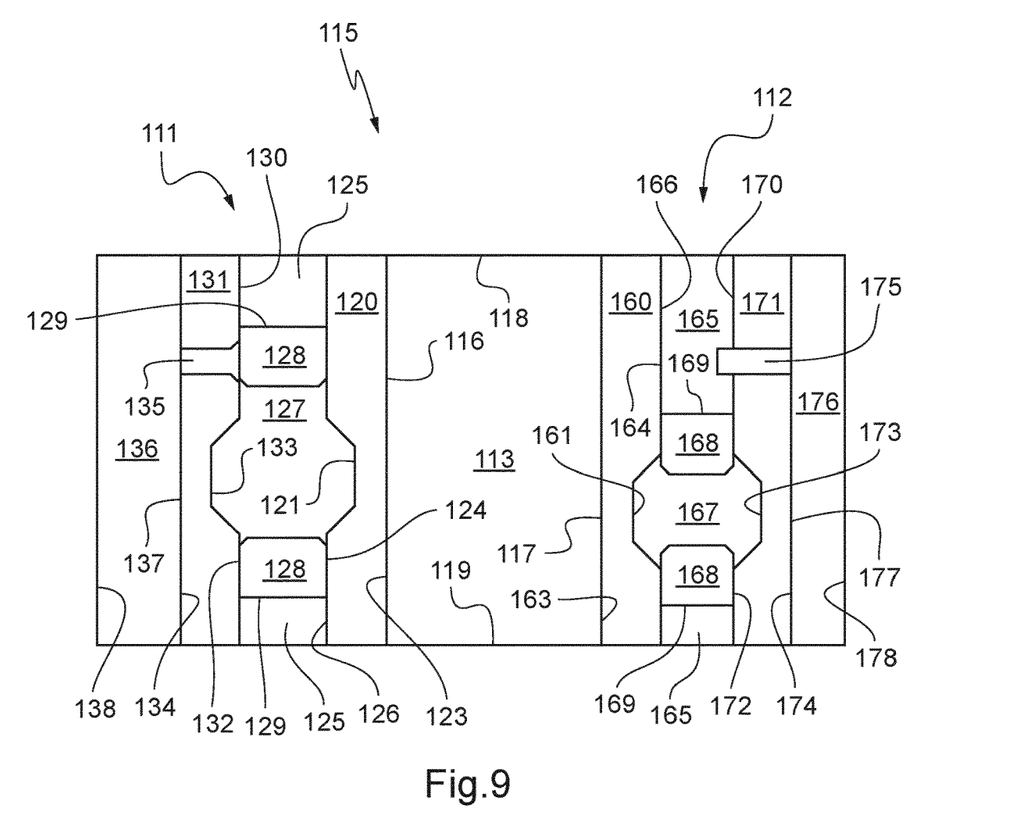
FIG. 9 is a top view of a sheet of cardboard from which is issued the internal cardboard support illustrated in FIG. 8.

The internal cardboard support 103 is issued from a sheet of cardboard 115 which is shown on FIG. 9.

In particular, the sheet of cardboard 115 comprises a central wall portion which forms the bottom wall 113 and which has four sides, respectively a first side 116, a second side 117 opposite to the first side 116, a third side 118 linked to the first and second sides 116, 117 and a fourth side 119 opposite to the third side 118 and also linked to the first and second sides 116, 117.

The sheet of cardboard 115 further comprises a first plurality of lateral wall portions extending from the first side 116 of the central wall portion and being configured to form the first edge member 111; and a second plurality of lateral wall portions extending from the second side 117 of the central wall portion and being configured to form the second edge member 112.

In the second embodiment of the internal cardboard support 103 of the cardboard packaging 101, the first and second pluralities of lateral wall portions are similar. The slight differences will be mentioned below.

The first plurality of lateral wall portions is provided with a first wall portion 120 which extends by a first side 123 from the first side 116 of the central wall portion.

The first wall portion 120 has a gripping cut-out 121 formed in a second side 124 opposite to the first side 123.

The first plurality of lateral wall portions is further provided with a second wall portion 125 which extends by a first side 126 from the second side 124 of the first wall portion 120.

The second wall portion 125 comprises a first opening 127 and two flap members 128 which face each other and delimit the first opening 127.

The second wall portion 125 comprises two folded lines 129 around which the flap members 128 are configured to rotate.

The first plurality of lateral wall portions is further provided with a third wall portion 131 which extends by a first side 132 from a second side 130 of the second wall portion 125 which is opposite to the first side 126 thereof.

The third wall portion 131 has a gripping cut-out 133 formed in the first side 132.

Both gripping cut-outs 121 and 133 respectively of the first and third wall portions 120 and 131 emerge in the first opening 127 of the second wall portion 125.

The third wall portion 131 has a first notch 135 which here extends for a second side 134 opposite to the first side 132 and emerges on the first side 132, in the vicinity of the first opening 127.

The first plurality of lateral wall portions is further provided with a fourth wall portion 136 which extends by a first side 137 from the second side 134 of the third wall portion 131.

The fourth wall portion 136 has a second side 138 opposite to the first side 137.

The second plurality of lateral wall portions is provided with a first wall portion 160 which extends by a first side 163 from the first side 116 of the central wall portion.

The first wall portion 160 has a gripping cut-out 161 formed in a second side 164 opposite to the first side 163.

The second plurality of lateral wall portions is further provided with a second wall portion 165 which extends by a first side 166 from the second side 164 of the first wall portion 160.

The second wall portion 165 comprises a second opening 167 and two flap members 168 which face each other and delimit the second opening 167.

The second wall portion 165 comprises two folded lines 169 around which the flap members 168 are configured to rotate.

The second plurality of lateral wall portions is further provided with a third wall portion 171 which extends by a first side 172 from a second side 170 of the second wall portion 165 which is opposite to the first side 166 thereof.

The third wall portion 171 has a gripping cut-out 173 formed in the first side 172.

Both gripping cut-outs 161 and 173 respectively of the first and third wall portions 160 and 171 emerge in the second opening 167 of the second wall portion 165.

The third wall portion 171 has a second notch 175 which here extends for a second side 174 opposite to the first side 172 and emerges on the first side 172. Here, the second notch 175 slightly extends in the second wall portion 165.

The second plurality of lateral wall portions is further provided with a fourth wall portion 176 which extends by a first side 177 from the second side 174 of the third wall portion 171.

The fourth wall portion 176 has a second side 178 opposite to the first side 177.

To be noted that in the illustrated embodiment, the second opening 167 is smaller than the first opening 127.

Figure 10:
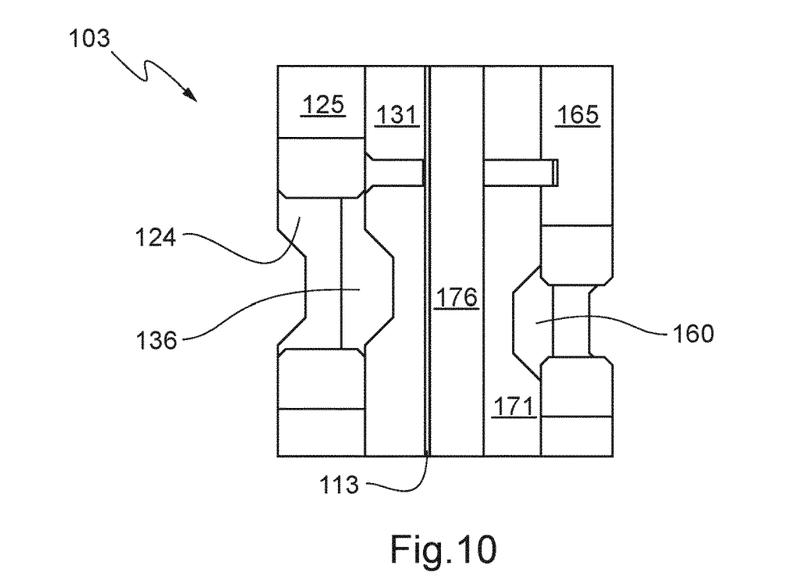
FIG. 10 is a top view of the internal cardboard support illustrated in FIG. 8, in a blank configuration.

The sheet of cardboard 115 is folded in order to provide the internal cardboard support 103 in a blank configuration which is shown on FIG. 10.

In particular, regarding the first plurality of wall portions, the fourth wall portion 136 is folded on the third wall portion 131 and also partially on the second wall portion 125, and all the second, third and fourth wall portions 125, 131 and 136 are folded on the first wall portion 120 and partially on the central wall portion.

Thus, the fourth wall portion 136 is located on the bottom wall 113 and is fixed thereof, for instance by gluing, the third wall portion 131 is located on the fourth wall portion 136 and the second wall portion 125 is located on the first wall portion 120 and partially on the fourth wall portion 136.

Similarly, regarding the second plurality of wall portions, all the second, third and fourth wall portions 165, 171 and 176 are folded on the first wall portion 160 and partially on the central wall portion.

Thus, the fourth wall portion 176 is located on the bottom wall 113 and is fixed thereof, for instance by gluing, the third wall portion 171 is located on the bottom wall 113 and the second wall portion 165 is located on the first wall portion 160 and partially on the bottom wall 113.

Thus, in the blank configuration of the internal cardboard support 103, the edge members 111 and 112 are at least partially flattened on the bottom wall 113.

This is from the blank configuration that the internal cardboard support 103 as shown on FIG. 8 in the erected configuration is obtained.

In particular, the internal cardboard support 103 in the blank configuration is provided. As stated above, the edge members 111 and 112 are at least partially flattened on the bottom wall 113. For instance, the internal cardboard support 103 in the blank configuration is stored in a magazine. Then, the internal cardboard support 103 in the blank configuration is grasped by a dedicated movable tool, such as a rotatable head or a robotised arm, and introduced into a channel member having a predetermined shape so that the wall portions of the edges members 111 and 112 raise and extend remote to the bottom wall 113.

As mentioned above, the locations of the different wall portions in said blank configuration depend of the dimensions of these respective wall portions. Variants are possible.

Figure 11:
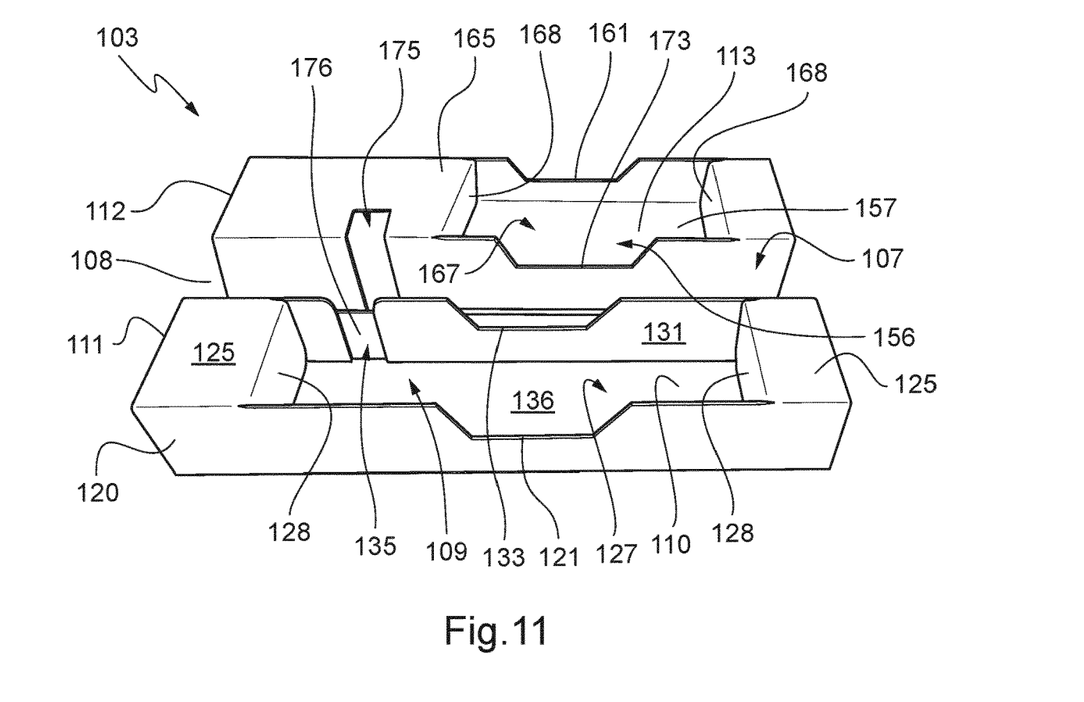
FIGS. 11 to 13 are top, perspective views of the internal cardboard support illustrated in FIG. 8, but taken alone and devoid of pharmaceutical items.
Figure 12:
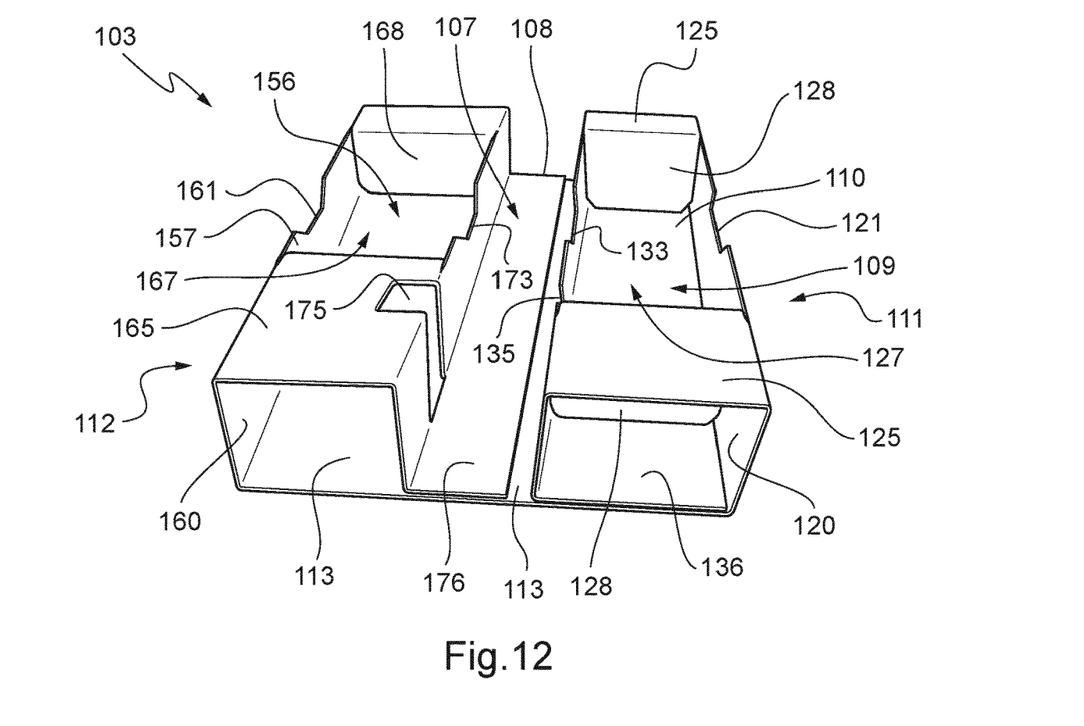
Figure 13:
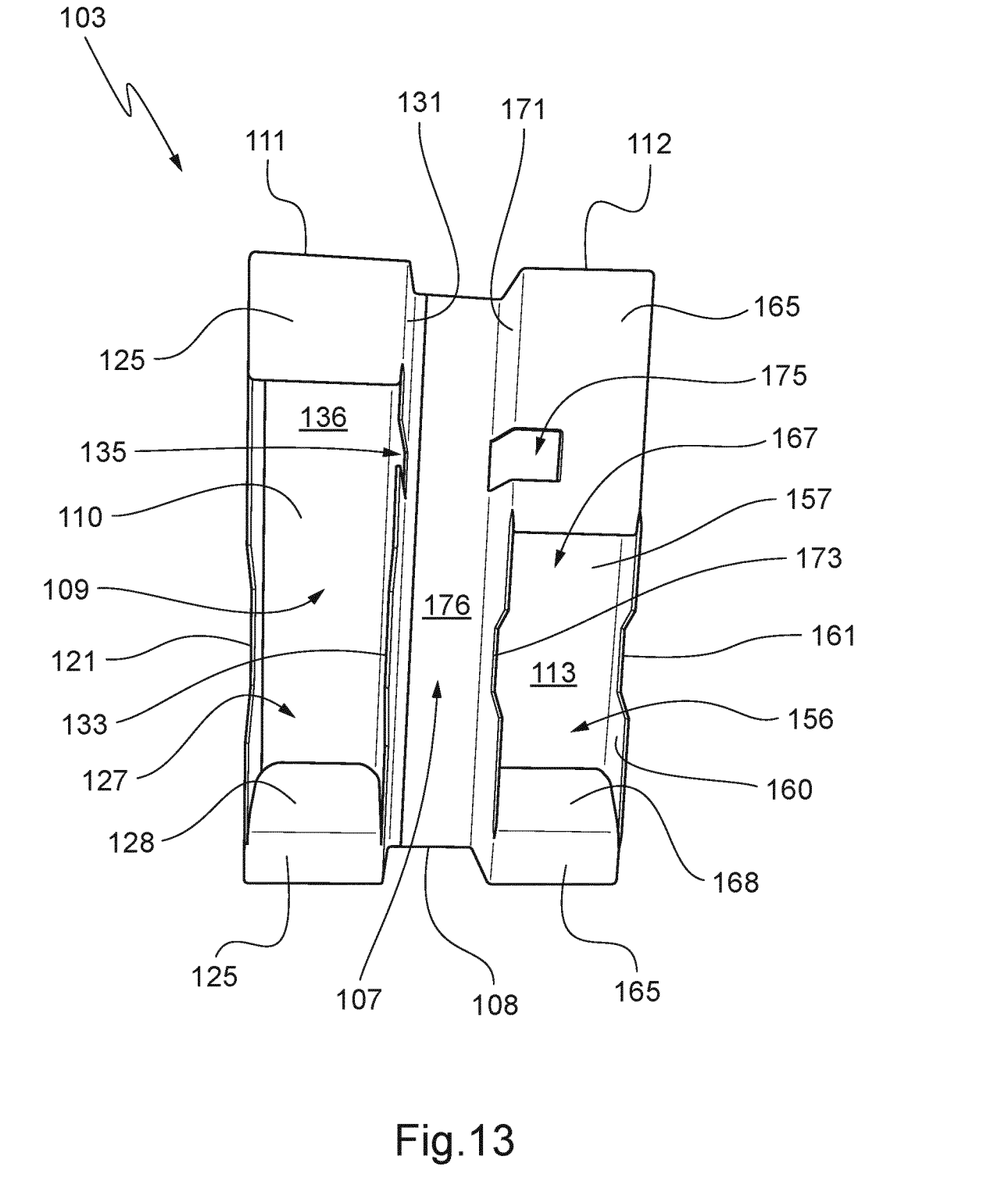

The internal cardboard support 103 in the erected configuration is shown in FIGS. 11 to 13 without a syringe, needles, or a vial.

The internal cardboard support 103 thus comprises the main compartment 108 located between the first and second edge members 111 and 112.

In particular, the first edge member 112 has the parallelepipedic shape in which the first wall portion 120 extends vertically from the bottom wall 113; the second wall portion 125 extends horizontally from the first wall portion 120 and faces the fourth wall portion 136; the third wall portion 131 extends vertically from the second wall portion 125, faces the first wall portion 120 and is directed towards the bottom wall 113; and the fourth wall portion 136 extends horizontally from the third wall portion 131, is fastened to the bottom wall 113 and is directed towards the first wall portion 120.

The first additional compartment 110 is formed in the first edge member 111 and the first opening 127 made on the second wall portion 125 which extends horizontally and remote to the bottom wall 113 allows to access to the first additional housing 109 for receiving the needles as shown on FIG. 8.

The two flap members 128 are rotated around the folded lines 129 of the second wall portion 125 and directed towards the fourth wall portion 136 and more generally towards the bottom wall 113.

Thus, the flap members 128 face to each other and delimit the length of the first additional housing 109.

To be noted that using such flap members 128 allow to have a length of the first additional housing 109 which is not fixed but rather slightly variable, depending on the inclination of the flap members 128 in the first additional compartment 110.

Furthermore, the flap members 128 may act such as retainers for the needles located in the first additional housing 109.

In particular, when the needles are introduced into the first additional compartment 110, they can be pushed against the flap members 128 so that they can define themselves the length of the first additional housing 109 in which they are located. When stored, free ends of the needles are thus in abutment against the flap members 128.

In variant, the flap members can be pushed by a dedicated tool before loading the needles.

The first and second gripping cut-outs 121 and 133 formed respectively in the first and third wall portions 120 and 131 of the first edge member 111 face to each other and allow to facilitate the access to the first additional housing 109 and to facilitate the handling of the needles.

The first notch 135 emerges on the third wall portion 131 of the first edge member 111, the latter forming a separation between the main housing 107 and the first additional housing 109.

The second edge member 112 has the parallelepipedic shape in which the first wall portion 160 extends vertically from the bottom wall 113; the second wall portion 165 extends horizontally from the first wall portion 160 and faces the bottom wall 113; the third wall portion 171 extends vertically from the second wall portion 165, faces the first wall portion 160 and is directed towards the bottom wall 113; and the fourth wall portion 176 extends horizontally from the third wall portion 171, is fastened to the bottom wall 113 and is directed towards the first edge member 111.

The second notch 175 emerges on both second wall portion 165 and third wall portions 171, the latter forming a separation between the main housing 107 and the second additional housing 156.

The second notch 175 faces at least partially the first notch 135.

The second additional compartment 157 is formed in the second edge member 112 and the second opening 167 on the second wall portion 165 and which extends horizontally and remote to the bottom wall 113 allows to access to the second additional housing 156 for receiving the vial as shown on FIG. 8.

The two flap members 168 are rotated around the folded lines 169 of the second wall portion 165 and directed towards the fourth wall portion 176 and more generally towards the bottom wall 113.

Thus, the flap members 168 face to each other and delimit the length of the second additional housing 156.

Similarly to what it is explained above, using such flap members 168 allow to have a length of the second additional housing 156 which is not fixed but rather slightly variable, depending on the inclination of the flap members 168 in the second additional compartment 157.

Furthermore, the flap members 168 may act such as retainers for the vial located in the second additional housing 156.

In particular, when the vial is introduced into the second additional compartment 157, the vial can be pushed against the flap members 168 so that they can define themselves the length of the second additional housing 156 in which the vial is located. When stored, free ends of the vial are thus in abutment against the flap members 168.

In variant, the flap members can be pushed by a dedicated tool before loading the vial.

The first and second gripping cut-outs 161 and 173 formed respectively in the first and third wall portions 160 and 171 of the second edge member 112 face to each other and allow to facilitate the access to the second additional housing 156 and to facilitate the handling of the vial.

Thus the syringe shown on FIG. 8 is housed in the main housing 107 defined between the third wall portion 176 of the second edge member 112 and the third wall portion 131 of the first edge member 111 and also bounded by a part of the bottom wall 113 and the fourth wall portion 176 of the second edge member 112 which is fastened on the bottom wall 113.

The syringe has a collar portion which is introduced into the first and second notches 135 and 175 and a body which extends longitudinally in the main housing 107 of the main compartment 108.

Figure 14:
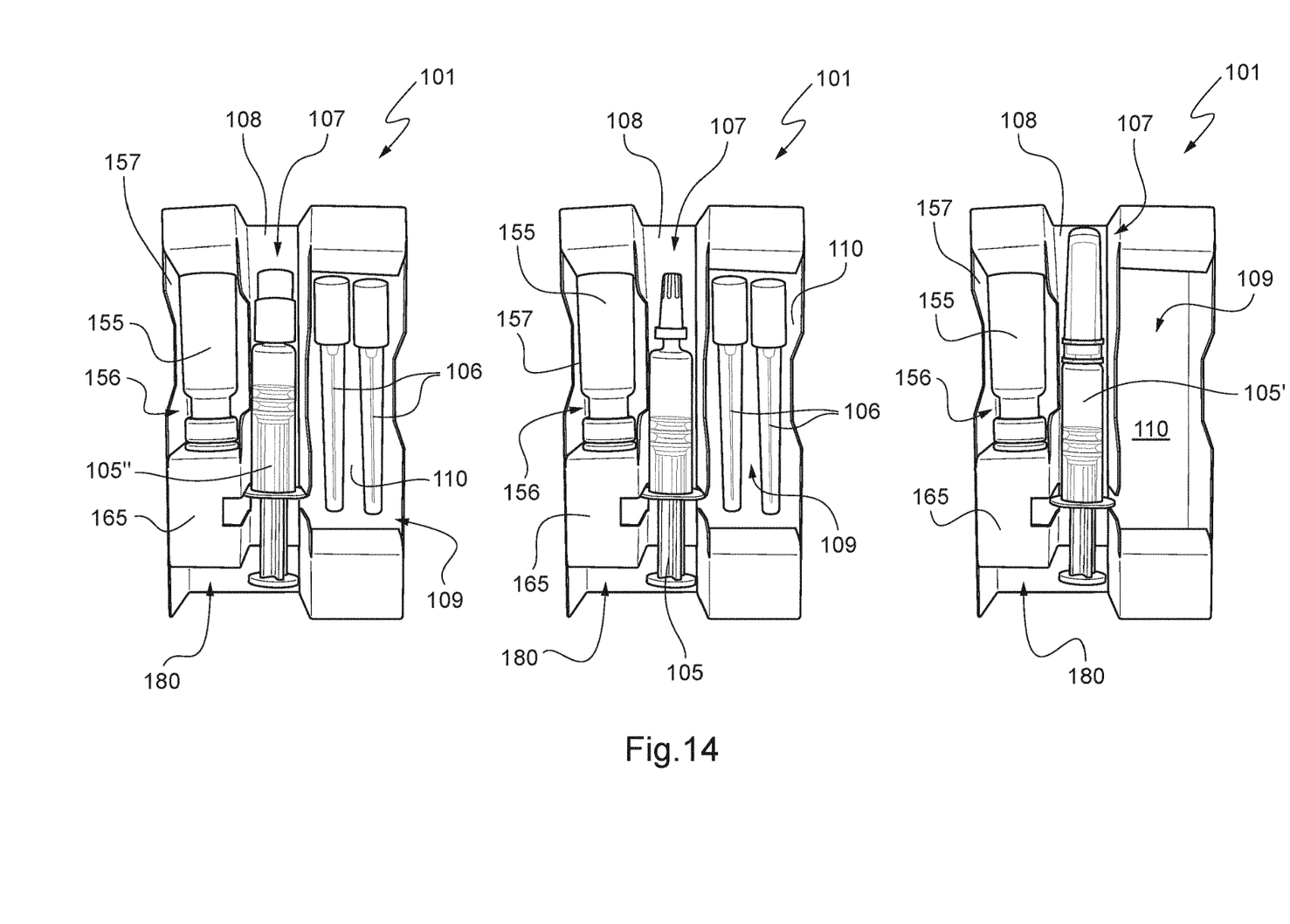
FIG. 14 is a top view of a set of cardboard packaging, each comprising an internal cardboard support according to a variant of the second embodiment and a plurality of pharmaceutical items chosen amongst predetermined combinations of pharmaceutical items.

FIG. 14 shows top views illustrating a set of cardboard packaging 101, each comprising an internal cardboard support 103 according to a variant, and a plurality of pharmaceutical items chosen amongst predetermined combinations of pharmaceutical items and located side by side in the internal cardboard support 103.

The internal cardboard supports illustrated on FIG. 14 are similar to the internal cardboard support illustrated on FIGS. 8 and 11 to 13, except that a further cut-out 180 is made on the second wall portion 165 of the second edge member 112 so that to facilitate the location of the syringe and in particular of the a head thereof.

The cardboard packaging 101 shown on the left of FIG. 14 comprises a so-called LLR syringe 105" located in the main housing 107 of the main compartment 108, two needles 106 located in the first additional housing 109 of the first additional compartment 110 of the internal cardboard support 103, and a vial 155 located in the second additional housing 156 of the second additional compartment 157 of the internal cardboard support 103.

The cardboard packaging 101 shown on the middle of FIG. 14 comprises a so-called LSP syringe 105 located in the main housing 107 of the main compartment 108, two needles 106 located in the first additional housing 109 of the first additional compartment 110 of the internal cardboard support 103, and a vial 155 located in the second additional housing 156 of the second additional compartment 157 of the internal cardboard support 103.

The cardboard packaging 101 shown on the right of FIG. 14 comprises a so-called SA25 syringe 105' located in the main housing 107 of the main compartment 108, and a vial 155 located in the second additional housing 156 of the second additional compartment 157 of the internal cardboard support 103. The first additional housing 109 of the first additional compartment 110 of the internal cardboard support 103 is empty.

Variants that are not illustrated are explained below.

The first and/or the second additional compartments may comprise several openings delimiting several first and/or second additional housings.

The first and/or second openings may be arranged in the first and/or third wall portions of the respective first and/or second edge members and optionally, the flap members are also formed on the first and/or third wall portions of the respective first and/or second edge members.

The main pharmaceutical item may be different from a syringe, for instance an injection pen.

The internal cardboard support can be devoid of notches.

The additional pharmaceutical items may be different from a needle or a vial, for instance a dedicated connector, a dressing or a plaster or a compress.

The internal cardboard support can be devoid of gripping cut-out.

The internal cardboard support may comprise further additional compartments juxtaposed to each other and/or further main compartments.

The cardboard packaging may comprise a plurality of internal cardboard supports introduced in the external box.

It should be noted more generally that the present disclosure is not limited to the examples described and represented.

The invention claimed is:

1. An internal cardboard support for a cardboard packaging configured for receiving pharmaceutical products, the internal cardboard support comprising:
   a main compartment having a main housing configured for receiving a main pharmaceutical item;
   a bottom wall; and
   two edge members protruding from the bottom wall;
      wherein the main compartment is located between the two edge members, the main housing being bounded by both the bottom wall and the two edge members, and each of the edge members having a plurality of wall portions that are arranged with respect to the bottom wall so that each edge member is of a substantially parallelepipedic shape and extends longitudinally along the main housing of the main compartment; and
      wherein at least one of the edge members forms an additional compartment comprising at least one additional housing that extends longitudinally, the at least one additional housing has an opening formed on at least one of the respective wall portions, and is configured for receiving through the opening at least one additional pharmaceutical item.

2. The internal cardboard support according to claim 1, wherein the at least one additional compartment that has the at least one additional housing comprises flap members that extend in the at least one additional compartment and delimit longitudinally the at least one additional housing.

3. The internal cardboard support according to claim 2, wherein the flap members are formed in the at least one of the respective wall portions that defines the opening.

4. The internal cardboard support according to claim 2, wherein the flap members are folded and directed towards the bottom wall.

5. The internal cardboard support according to claim 2, wherein the flap members face each other in the at least one additional housing.

6. The internal cardboard support according to claim 1, wherein the at least one additional compartment comprises:
   a first wall portion that extends vertically from the bottom wall;
   a second wall portion that extends horizontally from the first wall portion and that faces the bottom wall; and a third wall portion that extends vertically from the second wall portion, the third wall portion facing the first wall portion and directed towards the bottom wall.

7. The internal cardboard support according to claim 6, wherein the at least one opening of the at least one additional housing is formed in the second wall portion.

8. The internal cardboard support according to claim 6, wherein the at least one additional compartment comprises a fourth wall portion that extends from the third wall portion and that is fixed to the bottom wall.

9. The internal cardboard support according to claim 6, wherein the third wall portion forms a separate portion between the additional housing and the main housing.

10. The internal cardboard support according to claim 6, wherein the third wall portion and/or the first wall portion of the additional compartment comprises a gripping cut-out.

11. The internal cardboard support according to claim 6, wherein at least the third wall portion of the additional compartment comprises a notch emerging in the main housing and being configured for receiving a collar portion of the main pharmaceutical item.

12. The internal cardboard support according to claim 1, comprising a blank configuration in which the additional compartments are at least partially flattened on the bottom wall.

13. A cardboard packaging for pharmaceutical products, comprising:
    at least one internal cardboard support comprising a main compartment having a main housing, a bottom wall, and two edge members protruding from the bottom wall;
    a main pharmaceutical item introduced into the main housing of the main compartment of the internal cardboard support;
    at least one additional pharmaceutical item introduced into the at least one additional housing of the at least one additional compartment of the internal cardboard support;
        wherein the main compartment is located between the two edge members, the main housing being bounded by both the bottom wall and the two edge members, and each of the edge members having a plurality of wall portions that are arranged with respect to the bottom wall so that each edge member is of a substantially parallelepipedic shape and extends longitudinally along the main housing of the main compartment; and
        wherein at least one of the edge members forms an additional compartment comprising at least one additional housing that extends longitudinally, and the at least one additional housing has an opening formed on at least one of the respective wall portions.

14. The cardboard packaging according to claim 13, comprising an external box arranged for receiving the at least one internal cardboard support filled with the main pharmaceutical item and the at least one additional pharmaceutical item.

15. A set of cardboard packaging according to claim 13, comprising a plurality of internal cardboard supports in each of which is introduced a plurality of predetermined pharmaceutical items chosen amongst the combinations of a syringe and one or several needles, a syringe and one or several vials, a syringe and one or several needles and one or several vials and/or one or several dedicated connectors.

16. A method for packaging pharmaceutical products in a cardboard packaging, the method comprising:
    providing an internal cardboard support, the internal cardboard support comprising a main compartment having a main housing, a bottom wall, and two edge members protruding from the bottom wall;
    introducing a main pharmaceutical item into the main housing;
    introducing at least one additional pharmaceutical item into the at least one additional housing;
        wherein the main compartment is located between the two edge members, the main housing being bounded by both the bottom wall and the two edge members, and each of the edge members having a plurality of wall portions that are arranged with respect to the bottom wall so that each edge member is of a substantially parallelepipedic shape and extends longitudinally along the main housing of the main compartment; and
        wherein at least one of the edge members forms an additional compartment comprising at least one additional housing that extends longitudinally, and the at least one additional housing has an opening formed on at least one of the respective wall portions.

17. The method according to claim 16, comprising:
    providing the internal cardboard support in a blank configuration wherein the two edge members are at least partially flattened on the bottom wall; and
    raising the internal cardboard support from the blank configuration to an erected configuration in which wall portions of the edge members are raised and extend remotely to the bottom wall.

* * * * *